(12) United States Patent
Shi

(10) Patent No.: US 9,772,538 B2
(45) Date of Patent: Sep. 26, 2017

(54) TRANSPARENT DISPLAY DEVICE

(71) Applicant: BOE TECHNOLOGY GROUP CO., LTD., Beijing (CN)

(72) Inventor: Yue Shi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/358,412

(22) PCT Filed: Dec. 16, 2013

(86) PCT No.: PCT/CN2013/089604
§ 371 (c)(1),
(2) Date: May 15, 2014

(87) PCT Pub. No.: WO2015/014079
PCT Pub. Date: Feb. 5, 2015

(65) Prior Publication Data
US 2015/0160525 A1    Jun. 11, 2015

(30) Foreign Application Priority Data

Jul. 31, 2013    (CN) .......................... 2013 1 0328589

(51) Int. Cl.
*G02F 1/153*    (2006.01)
*G02F 1/155*    (2006.01)
(Continued)

(52) U.S. Cl.
CPC .............. *G02F 1/155* (2013.01); *G02F 1/157* (2013.01); *G02B 6/0063* (2013.01); *G02F 1/1521* (2013.01); *G02F 2201/44* (2013.01)

(58) Field of Classification Search
CPC ..... G02B 6/0011; G02F 1/1521; G02F 1/155; G02F 1/157
(Continued)

(56) References Cited

U.S. PATENT DOCUMENTS 3,998,525 A * 12/1976 Giglia .................... G02F 1/157
  359/272
7,719,185 B2    5/2010 Jin et al.
(Continued)

FOREIGN PATENT DOCUMENTS

CN    1988169 A    6/2007
CN    101216652 A    7/2008
(Continued)

OTHER PUBLICATIONS

International Search Report, International Preliminary Report on Patentability and Written Opinion of the International Searching Authority of PCT/CN2013/089604 in Chinese, dated May 14, 2014.
(Continued)

*Primary Examiner* — Scott J Sugarman
*Assistant Examiner* — Vipin Patel
(74) *Attorney, Agent, or Firm* — Collard & Roe, P.C.

(57) ABSTRACT

A transparent display device, comprising: a display panel; a system light source provided over a non-display surface of the display panel; an article placement area located at a side of the system light source that is away from the display panel; an encapsulated cell provided between the system light source and the article placement area, wherein the encapsulated cell is provided with an electrochromic material therein; and a control member that is capable of controlling the electrochromic material in the encapsulated cell to regionally switch to a transparent state or a colored state. The present invention can realize a regionally transparent display and expand the application range of the transparent display device.

17 Claims, 3 Drawing Sheets

(51) Int. Cl.
*G02F 1/157* (2006.01)
*G02F 1/15* (2006.01)
*F21V 8/00* (2006.01)

(58) Field of Classification Search
USPC .......................................................... 359/275
See application file for complete search history.

(56) References Cited

U.S. PATENT DOCUMENTS

| | | |
|---|---|---|
| 8,770,813 B2 | 7/2014 | Bohn et al. |
| 9,442,338 B2* | 9/2016 | Uhm ....................... G02F 1/155 |
| 2009/0321728 A1 | 12/2009 | Seo |
| 2012/0050975 A1* | 3/2012 | Garelli .................. G06F 1/1615 361/679.27 |
| 2014/0085568 A1 | 3/2014 | Li et al. |
| 2014/0240652 A1 | 8/2014 | Satoh et al. |

FOREIGN PATENT DOCUMENTS

| | | |
|---|---|---|
| CN | 102537785 A | 7/2012 |
| CN | 102737576 A | 10/2012 |
| CN | 102866526 A | 1/2013 |
| CN | 103135278 A | 6/2013 |
| CN | 103185983 A | 7/2013 |
| CN | 103207493 A | 7/2013 |
| CN | 103412452 A | 11/2013 |

OTHER PUBLICATIONS

Chinese Office Action of Chinese Application No. 201310328589.3, dated May 5, 2015 with English translation.
English translation of the International Preliminary Report on Patentability and Written Opinion of the International Searching Authority of PCT/CN2013/089604, dated Feb. 2, 2016.
Second Chinese Office Action of Chinese Application No. 201310328589.3, dated Dec. 17, 2015 with English translation.

* cited by examiner

US 9,772,538 B2

TRANSPARENT DISPLAY DEVICE

CROSS REFERENCE TO RELATED APPLICATIONS

This application is the National Stage of PCT/CN2013/089604 filed on Dec. 16, 2013, which claims priority under 35 U.S.C. §119 of Chinese Application No. 201310328589.3 filed on Jul. 31, 2013, the disclosure of which is incorporated by reference. The international application under PCT article 21(2) was not published in English.

TECHNICAL FIELD

Embodiments of the present invention relate to a transparent display device.

BACKGROUND

With the development of display technology and the progressively increased demands on portable informational media of people, the transparent display device capable of realizing images thereon and allowing the articles at the backside thereof visible have been actively studied for the past few years. Such kind of transparent display device can be applied in windshields for vehicles and glasses for dwelling houses to provide the users with required information. Therefore the applicability of such kind of transparent display device has been significantly improved.

A conventional transparent display device has a structure comprising a display panel, a system light source located at a non-display surface of the display panel, an article placement area located at a side of the system light source that is away from the display panel, two polarizers located at both sides of an external surface of the display panel; and liquid crystal molecules in the display panel are located between the two polarizers; the polarization direction of lights is changed by processing film layers on the polarizers and controlling a rotation of the liquid crystal molecules by utilizing an electric filed, so that the article in the article placement area can be observed through the display panel under the action of ambient lights. That is, both the display content on the display panel and the article in the article placement area behind the display panel are observed, which permits a transparent display effect.

The transparent display device that realizes a transparent display effect by means of an action of cooperative polarizers in the conventional technology can achieve a good transparent display effect, however, when a transparent display effect is realized, it cannot conduct a regionally transparent display but a transparent display over the entire display panel, which, to some extent, restricts widespread application of the transparent display device.

SUMMARY

According to an aspect of the invention, it provides a transparent display device, comprising: a display panel; a system light source located at a non-display surface of the display panel; an article placement area located at a side of the system light source which is away from the display panel; an encapsulated cell located between the system light source and the article placement area, the encapsulated cell is provided with electrochromic material therein; and a control member that is capable of controlling the electrochromic material in the encapsulated cell to regionally switch between a transparent state and a colored state.

BRIEF DESCRIPTION OF THE DRAWINGS

Embodiments of the present invention will be described in more detail below with reference to the accompanying drawings to enable those skilled in the art to understand the present invention more clearly, wherein.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The twins, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at least one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Embodiment 1

The electrochromism display (ECD) refers to that the electrochromic material can produce stable and reversible change in optical properties under an action of electric filed, which is corresponding to the photochromism and the thermochromism. Generally, such kind of reversible change is occurred between a colorless transparent state and a colored state, or between two different colors. The principle of electrochromism mainly depends on the energy band structure and oxidation reduction property of a chemical composition of the material; the absorption character of the material in visible light region can be modulated by injection and extraction of ions and electrons, or, the infrared reflection property can be modulated by changing the carrier concentration and plasma oscillation frequency.

Figure 1:
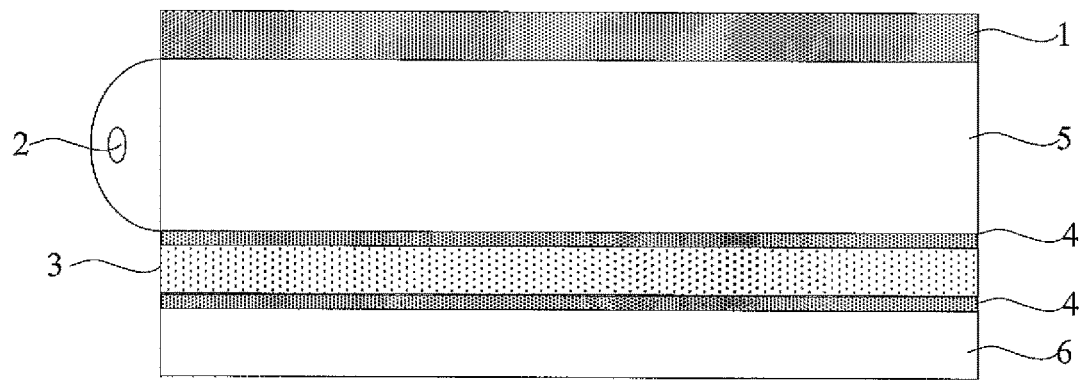
FIG. 1 is a cross-sectional schematic view of a transparent display device provided in an embodiment of the present invention.

An embodiment of the present invention provides a transparent display device. As shown in FIG. 1, the transparent display device comprises a display panel 1, a system light source 2 located at a non-display surface of the display panel 1, and an article placement area 6 located at a side of the system light source 2 which is away from the display panel 1. The device further comprises an encapsulated cell 3 located between the system light source 2 and the article placement area 6, wherein the encapsulated cell 3 is provided with an electrochromic material therein. The electrochromic material can stably and reversibly change between a transparent state and a colored state under an action of electric filed.

For example, the transparent display device provided by an embodiment of the present invention further comprises a control member 4 capable of controlling the electrochromic material in the encapsulated cell 3 to regionally switch to a transparent state and a colored state.

One surface of the display unit 1 that faces the observing of the user is the display surface, while the other surface of the display unit 1 that faces away from the observing of the user is the non-display surface.

In addition, the system light source 2 can be an area light source which emits lights over its entire surface, or can be assembled from components such as light source and light-guide plate.

For example, further referring to FIG. 1, the system light source in an embodiment of the present invention comprises a light source 2 and a light-guide plate 5. The light-guide plate 5 is located at a non-display surface of the display panel 1, and the light source 2 is located at an area opposite to at least one side of the light-guide plate 5. Furthermore, according to embodiments of the present invention, a plurality of light sources 2 may be provided, or only one light source 2 may be provided. The light source 2 can abut against a side of the light-guide plate 5, or can be disposed at a position spaced apart from the side of the light-guide plate 5 at a distance. The light source 2 can be implemented in a form of Light Emitting Diode (LED) particles, LED light bar(s), Cold Cathode Fluorescent Lamp(s) (CCFL(s)), etc., but the present invention is not limited thereto.

For example, the encapsulated cell 3 in an embodiment of the present invention can have a size identical with that of the display panel 1, but the present invention is not limited thereto. For example, the size of the encapsulated cell 3 can be larger than the size of the display panel 1.

For example, the encapsulated cell 3 and the control member 4 in an embodiment of the present invention are disposed between the light-guide plate 5 and the article placement area 6. The control member 4 controls the electrochromic material in the encapsulated cell 3 to regionally switch to a transparent state or a colored state. When the electrochromic material exhibits a transparent state, lights emitted from an article placed in the article placement area 6 can transmit through an area corresponding to the electrochromic material which exhibits a transparent state, and then transmit through the display panel 1. The article placed in the article placement area 6 can be observed, so that a transparent display is achieved. As a contrast, when the control member 4 controls the electrochromic material to exhibit a colored state, all the lights incident on the surface of the electrochromic material are absorbed without transmitting through the display panel 1. Therefore, the article placed in the article placement area 6 cannot be observed but only the content displayed on the display panel 1 can be observed, so that a non-transparent display is achieved.

In the transparent display device provided by the embodiment of the present invention, an encapsulated cell 3 containing an electrochromic material is disposed between a light-guide plate and an article placement area, the electrochromic material in the encapsulated cell 3 can regionally switch to a transparent state and a colored state under the control of a control member, thus a regionally transparent display can be achieved, thereby the application range of the transparent display device is expanded.

Embodiment 2

A transparent display device provided by another embodiment of the present invention will be described in details hereinafter.

In the second embodiment of the present invention, the encapsulated cell 3 is formed by engaging two transparent substrates together. The transparent substrate may be made of transparent material selected from glass, plastic or quartz, with relatively simple preparation process. Moreover, the encapsulated cell 3 is provided with an electrochromic material therein, that is, the electrochromic material is disposed between two transparent substrates such that the electrochromic material is distributed over the entire internal surfaces of the two transparent substrates which are engaged together.

For example, the electrochromic material in the embodiments of the present invention can be organic electrochromic material, inorganic electrochromic material, or organic-inorganic composite electrochromic material. The organic electrochromic material can be polythiophenes and derivatives thereof, viologen, tetrathiafulvalene, metallic phthalocyanine compound, polyaniline and the like; the inorganic electrochromic material can be tungsten trioxide ($WO_3$), molybdenum trioxide ($MoO_3$), vanadium pentoxide ($V_2O_5$) and the like; the organic-inorganic composite electrochromic material can be selected from any combination of two of the above-listed materials. Since the material can be selected in a relatively wider range, various methods can be adopted for disposing the material in the encapsulated cell 3 depending on types of the material. For example, if the selected electrochromic material is in a liquid state, a perfusion method can be adopted; if the selected electrochromic material is in a solid state, a method such as sputtering and coating can be adopted.

The embodiment of the present invention chooses to adopt an encapsulated cell provided with electrochromic material to realize a regionally transparent display. When implemented, under a transparent display state, a higher transmissivity more than 85% can be obtained, which leads to an even higher transmissivity for the transparent display device to conduct a transparent display, and the driving voltage for applying an electric field to the electrochromic material is relatively low, which is generally 1~2 V. Therefore, the implementation is much simpler.

In embodiments of the present invention, when the electrochromic material in the encapsulated cell is controlled to regionally switch to a transparent state and a colored state by utilizing the control member to realize a regionally transparent display of the transparent display device, the control member can be configured as several transparent electrode set of which a state of being charged or not can be individually controlled, with each transparent electrode set including two transparent electrodes.

When implemented, several transparent electrodes can be respectively disposed, in the same arrangement manner, on the external surfaces of the two transparent substrates which are engaged together to form the encapsulated cell 3, such that two transparent electrodes at opposite locations in a height direction of the cell are connected to an external power supply through leads to constitute a transparent electrode set of which a state of being charged or not can be individually controlled.

The control member 4 includes several transparent electrode sets of which a state of being charged or not can be individually controlled. By individually controlling each transparent electrode set in a state of being charged or not, the electrochromic material located in an area of the encapsulated cell corresponding to a location of each transparent electrode set can be respectively controlled to switch to a transparent state or a colored state, and then a regionally transparent display of the transparent display device can be achieved.

For example, the transparent electrodes in embodiments of the present invention can be made of one or more material selected from Indium Tin Oxide (ITO), Indium Zinc Oxide (IZO), Indium Gallium Zinc Oxide (IGZO) and the like. The present invention is not limited thereto, the transparent electrodes can be made of other materials.

For example, the transparent electrode in embodiments of the present invention can be flexibly configured to have predetermined shapes according to actual conditions. In order to take full advantageous of the electric field produced by the transparent electrodes in each transparent electrode set so as to control the electrochromic material to switch to a transparent state or a colored state, the two transparent electrodes included in each transparent electrode set in embodiments of the present invention can be configured as electrodes having identical shape.

For example, in embodiments of the present invention, the transparent electrode is configured as a plate electrode in a rectangle shape so as to allow the corresponding area in the encapsulated cell controlled by the electrode to cover the entire display panel in a better way. Other shapes, such as triangle and polygon, are also possible, as long as a corresponding area thereof can cover the entire display panel.

For example, in embodiments of the present invention, several transparent electrodes each having a shape of rectangular and a form of plate electrode are arranged in an array on the external surfaces of the two transparent substrates which are engaged together, so as to cover the entire display panel in a better way.

Figure 2A:
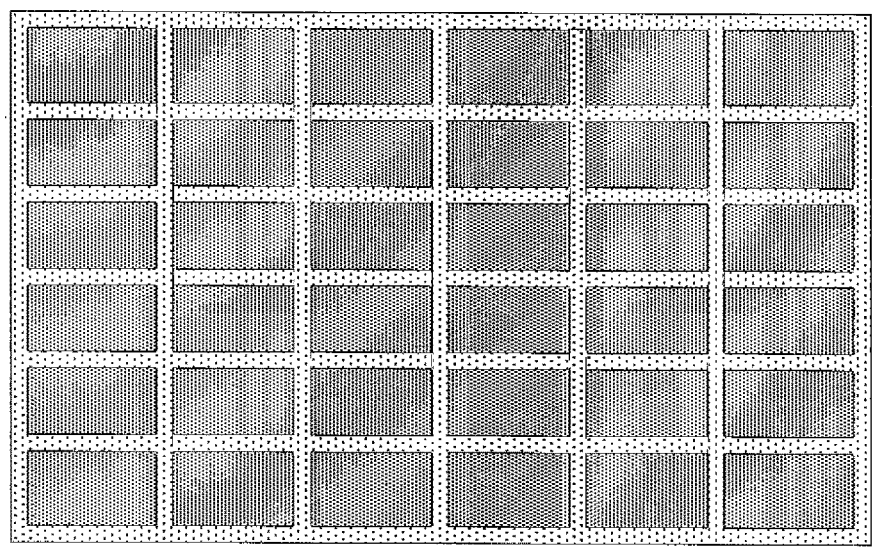
FIG. 2A-2B are schematic top view and cross-sectional view of transparent electrodes of the display panel provided in an embodiment of the present invention, respectively.
Figure 2B:
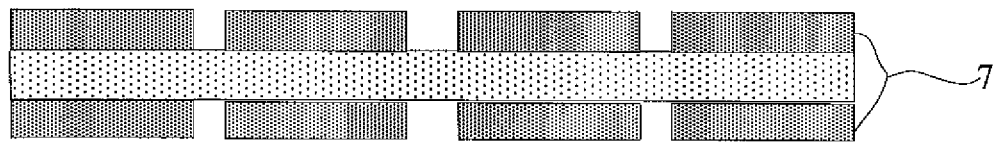

FIG. 2A shows a top view of an embodiment of the present invention provided with transparent electrodes each having a shape of rectangular and a form of plate electrode. Each rectangular region in FIG. 2A represents a transparent electrode, below which is another transparent electrode having a fully identical size and shape therewith, and the two electrodes constitute a transparent electrode set 7, as shown in FIG. 2B. A state of being charged or not for each transparent electrode set can be individually controlled, and then the electrochromic material can be allowed to regionally switch to a transparent state or a colored state.

For example, the arrangement manner of the transparent electrodes arranged in an array in the embodiments of the present invention can be identical with that of the pixel regions of the display panel, that is, identical with the arrangement manner of the pixel regions on the display panel, to achieve a transparent display in a better way.

Hereinafter, the principle for controlling the electrochromic material to regionally switch to a transparent state or a colored state through a state of being charged or not of the transparent electrode set so as to allow the transparent display device to realize a transparent display and a non-transparent display will be explained.

Figure 3:
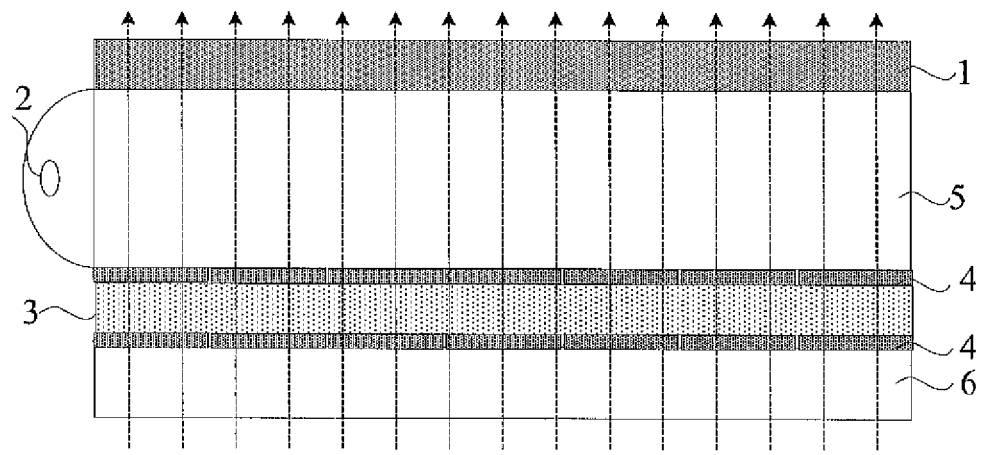
FIG. 3 is a schematic diagram illustrating a transparent display device according to an embodiment of the present invention which realizes a full transparent display.

A. when it needs to realize a transparent display, all the transparent electrode sets constituted by transparent electrodes each having a shape of rectangular and a form of plate electrode are not charged, such that the whole electrochromic material in the entire encapsulated cell exhibit a transparent state, as shown in FIG. 3. Under this condition, the transparent display device conducts a full transparent display and the article placed in the article placement area can be observed, so that a full transparent display of the transparent display device is achieved.

Figure 4:
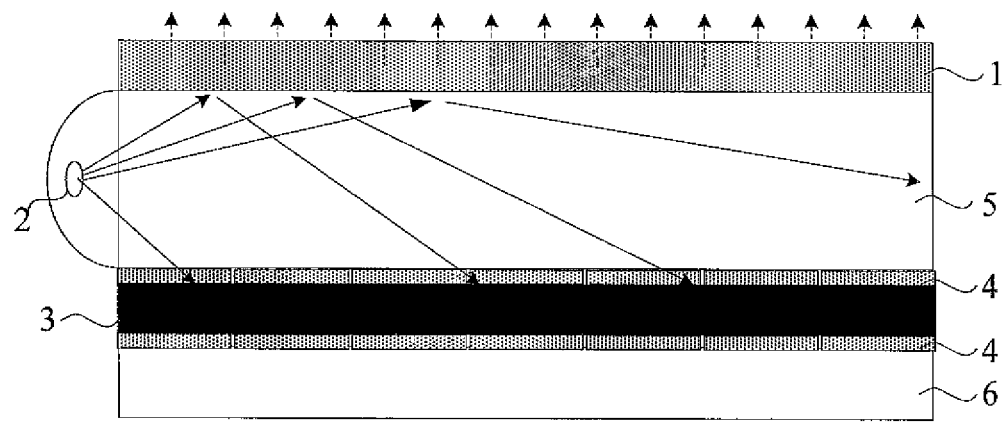
FIG. 4 is a schematic diagram illustrating a transparent display device according to an embodiment of the present invention which realizes a non-transparent display.

B. when it needs to realize a non-transparent display, all the transparent electrode sets constituted by transparent electrodes each having a shape of rectangular and a form of plate electrode are charged, such that the whole electrochromic material in the entire encapsulated cell exhibit a colored state and all lights incident on the surface of the electrochromic material are absorbed without transmitting through the display panel, as shown in FIG. 4. Under this condition, the transparent display device conducts a non-transparent display, and the article in the article placement area can not be observed but only the content displayed on the display panel can be observed.

Figure 5:
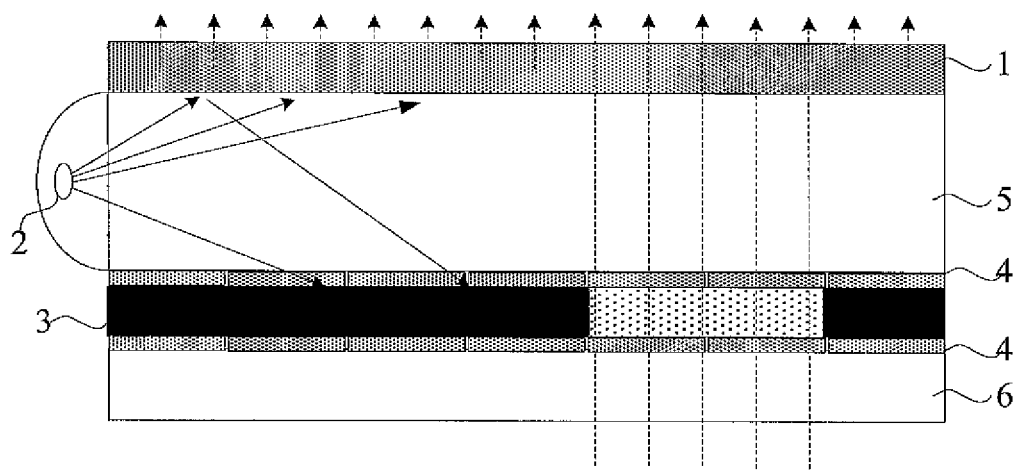
FIG. 5 is a schematic diagram illustrating a transparent display device according to an embodiment of the present invention which realizes a regionally transparent display.

C. when it needs to realize a regionally transparent display, the transparent electrode sets corresponding to the regions required a transparent display are powered-off and not charged, such that the electrochromic material in the encapsulated cell that is corresponding to this region exhibits a transparent state while the other regions exhibit a colored state, as shown in FIG. 5. Under this condition, the transparent display device conducts a regionally transparent display and the article in the article placement area corresponding to the region that exhibit a transparent state can be observed.

In the transparent display device provided by embodiments of the present invention, an encapsulated cell 3 containing an electrochromic material is disposed between a system light source and an article placement area, the electrochromic material in the encapsulated cell 3 can regionally switch to a transparent state and a colored state by controlling the transparent electrode in a state of being charged or not, so as to achieve a regionally transparent display, which expands the application range of the transparent display device.

It is apparent that an ordinary person in the art can make numerous variations and modifications to the present invention without departure from the spirit and the scope of the present invention, thus any other embodiments, variants, modifications and their equivalents without creative labor shall fall in the scope of the present invention.

What is claimed is:
1. A transparent display device, comprising:
a display panel;
a system light source provided at a side face of non-display surface sides of the display panel;
an article placement area located at a side of the system light source and away from the display panel;
an encapsulated cell provided between the system light source and the article placement area, wherein the encapsulated cell is provided with an electrochromic material therein; and a control member that is configured to control the electrochromic material in the encapsulated cell to regionally switch to a transparent state or a colored state to allow a regionally transparent display being achieved,
wherein the control member comprises more than one transparent electrode set of which a state of being charged or not is individually controllable, each transparent electrode set includes two transparent electrodes at opposite locations in a height direction of the encapsulated cell, and
wherein the transparent electrodes of the more than one transparent electrode set are arranged at spaces in an array on the external surfaces of the transparent substrates.

2. The transparent display device according to claim 1, wherein the system light source comprises a light source and a light-guide plate; the light-guide plate is provided on the non-display surface side of the display panel, and the light source is disposed in an area opposite to at least one side of the light-guide plate.

3. The transparent display device according to claim 1, wherein the encapsulated cell is formed by two transparent substrates which are assembled together, and the electrochromic material is disposed between the two transparent substrates.

4. The transparent display device according to claim 3, wherein, the two transparent electrodes in each transparent electrode set are connected to an external power supply through leads; and the electrochromic material in an area of the encapsulated cell that is corresponding to a location of each transparent electrode set is configured to be respectively controlled to switch to a transparent state or a colored state by individually controlling each transparent electrode set in a state of being charged or not.

5. The transparent display device according to claim 4, wherein the two transparent electrodes included in each transparent electrode set have a predetermined and identical shape.

6. The transparent display device according to claim 4, wherein the transparent electrodes are plate electrodes having a shape of rectangular.

7. The transparent display device according to claim 1, wherein an arrangement manner of the transparent electrodes arranged in an array is identical with an arrangement manner of pixel regions on the display panel.

8. The transparent display device according to claim 4, wherein the transparent electrodes are made of one or more materials selected from the group consisting of Indium Tin Oxide, Indium Zinc Oxide, and Indium Gallium Zinc Oxide.

9. The transparent display device according to claim 1, wherein the electrochromic material includes an organic electrochromic material, an inorganic electrochromic material, or an organic-inorganic composite electrochromic material.

10. The transparent display device according to claim 9, the organic electrochromic material can be polythiophenes and derivatives thereof, viologen, tetrathiafulvalene, metallic phthalocyanine compound, polyaniline and the like; the inorganic electrochromic material can be tungsten trioxide ($WO_3$), molybdenum trioxide ($MoO_3$), vanadium pentoxide ($V_2O_5$) and the like; the organic-inorganic composite electrochromic material can be selected from any combination of two of the above-listed materials.

11. The transparent display device according to claim 2, wherein the encapsulated cell is formed by two transparent substrates which are assembled together, and the electrochromic material is disposed between the two transparent substrates.

12. The transparent display device according to claim 5, wherein the transparent electrodes are plate electrodes having a shape of rectangular.

13. The transparent display device according to claim 12, wherein the transparent electrodes which are plate electrodes in a rectangular shape are arranged in an array on the external surfaces of the transparent substrates.

14. The transparent display device according to claim 5, wherein the transparent electrodes are made of one or more materials selected from the group consisting of Indium Tin Oxide, Indium Zinc Oxide, and Indium Gallium Zinc Oxide.

15. The transparent display device according to claim 6, wherein the transparent electrodes are made of one or more materials selected from the group consisting of Indium Tin Oxide, Indium Zinc Oxide, and Indium Gallium Zinc Oxide.

16. The transparent display device according to claim 2, wherein the electrochromic material includes an organic electrochromic material, an inorganic electrochromic material, or an organic-inorganic composite electrochromic material.

17. The transparent display device according to claim 3, wherein the electrochromic material includes an organic electrochromic material, an inorganic electrochromic material, or an organic-inorganic composite electrochromic material.

* * * * *